United States Patent

Waaben

[15] 3,701,907

[45] Oct. 31, 1972

[54] CIRCUIT EMPLOYING CHARGE STORAGE DIODE IN FAST DISCHARGE MODE

[72] Inventor: Sigurd G. Waaben, Princeton, N.J.

[73] Assignee: Bell Telephone Laboratories, Incorporated, Murray Hill, Berkeley Heights, N.J.

[22] Filed: Oct. 23, 1970

[21] Appl. No.: 83,634

Related U.S. Application Data

[62] Division of Ser. No. 781,167, Dec. 4, 1968, Pat. No. 3,626,213.

[52] U.S. Cl. ..................307/235, 307/281, 307/319, 328/151

[51] Int. Cl. ..........................H03k 5/20, H03k 17/74

[58] Field of Search.............307/281, 319, 320, 235; 328/151

[56] References Cited

OTHER PUBLICATIONS

T. Peter Sylvan " Measurement of Stored Charge in Diode Clearly Defines Switching Speed" June 28, 1965 Electronics pp. 84- 88.

*Primary Examiner*—John Zazworsky
*Attorney*—R. J. Guenther and Kenneth B. Hamlin

[57] ABSTRACT

The output of a charge storage diode in its reverse conducting spike discharge mode utilized to impose a fixed supplemental charge on a capacitor in each of plural sample and hold circuits just after a signal sample charge has been placed in the capacitor. Isolating diodes couple a common signal source to the respective capacitors, and each diode is reversely biased by the total of the sample and supplemental charges in its holding capacitor to prevent crosstalk among the various holding capacitors. A memory drive circuit and a single sample and hold circuit are also shown to demonstrate the mentioned spike discharge mode of charge storage diode operation.

5 Claims, 4 Drawing Figures

CIRCUIT EMPLOYING CHARGE STORAGE DIODE IN FAST DISCHARGE MODE

This is a division of application Ser. No. 781,167, filed Dec. 4, 1968 now U.S. Pat. No. 3,626,213.

BACKGROUND OF THE INVENTION

1. Field of the Invention

This invention relates to discharge control circuits for charge storage diodes and it relates in particular to such control circuits in which an output spike discharge is produced from the diode to facilitate operation of a time division multiplex sample and hold distribution circuit.

2. Description of the Prior Art

Distribution circuits, such as time division multiplex sample and hold circuits, must achieve sequential time gating from a common signal source to plural output circuits while at the same time avoiding crosstalk among the output circuits. Crosstalk arises, for example, by way of the distribution connection and by way of circulating ground currents where the output circuits share a common ground bus. Sample and hold circuits generally employ some form of capacitive device for holding signal samples in the various output circuits, and complex gating arrangements are provided to achieve the desired level of isolation.

Simpler isolation techniques are known in the art, but they have serious drawbacks that have prevented their utilization in time division sample and hold arrangements. For example, it is well known to employ a series diode in a peak signal detector to prevent loss of a capacitively stored signal sample after the input signal has fallen below the peak value. However, that technique has not been useful in time division sample and hold systems because a subsequently received signal sample may have a higher peak and interfere with the previous sample. It is similarly known in the art to charge a capacitor to a sufficient level to bias a diode to a nonconducting state, but the charge employed usually has no information-representative function so its exact level is not critical.

The current carrier storing capabilities of charge storage diodes have been long known in the art, and such storage capabilities have been increasingly turned to advantage as, for example, in the copending application Serial No. 679,859, filed November 1, 1967, of J. D. Heightley, C. B. Roundy, and S. G. Waaben, which was entitled "Interlaced Current Pulse Configuration Control," and now patent No. 3,550,098. Such diodes have been heretofore discharged in a controllable manner through load circuits to produce predetermined load circuit effects, and wherein the load circuit has a significant time constant. A discharge current pulse from a charge storage diode in such circuits is relatively broad and occupies a time interval with a duration which depends upon the impedance characteristics of the mentioned load circuit.

It is one object of the present invention to utilize a spike discharge mode of operation for a charge storage diode and wherein the diode discharge time is relatively free of load circuit dependence.

It is another object to utilize the spike discharge mode of charge storage diode operation to facilitate operation of time division multiplex sample and hold circuit.

A further object is to utilize the spike discharge mode of charge storage diode operation in cooperation with holding capacitors of time division multiplex sample and hold circuits to enable the utilization of held information signal samples for isolation functions as well.

SUMMARY OF THE INVENTION

The aforementioned and other objects of the invention are realized in an illustrative embodiment in which a charge storage diode is discharged by the application of a current pulse of sufficient magnitude to discharge the diode almost instantaneously with a spike of current in a circuit path of low impedance. A current spike is herein considered to mean a current pulse in which the pulse rise and fall times are determined primarily by the bulk resistance of semiconductor devices in the circuit in which the current spike flows because all such devices operate in a saturated condition, i.e., a condition in which current can be increased without substantially changing the potential difference across the device. The diode is discharged into a capacitor for providing a fixed unit of charge therein with a comparatively low drive voltage but in a short time.

It is one feature of the invention that the diode discharge current amplitude is limited primarily by the bulk resistance of any semiconductor devices in the discharge path.

It is a feature of one embodiment of the invention that the diode discharge circuit includes a holding capacitor for a sample and hold circuit in a time shared sample and hold system wherein analog signals are applied to the capacitor through an isolating diode, and thereafter the charge in the charge storage diode is transferred rapidly in a spike current pulse fashion to the holding capacitor to impose a total potential difference across the capacitor which is greater than the maximum anticipated analog signal so that the isolating diode is thereby effectively reversely biased to prevent crosstalk from influencing the charge theretofore placed on the holding capacitor.

BRIEF DESCRIPTION OF THE DRAWINGS

A more complete understanding of the invention and its various features, objects, and advantages may be obtained from a consideration of the following description when taken in connection with the appended claims and the attached drawing in which:

DETAILED DESCRIPTION

Figures 1, 1A:
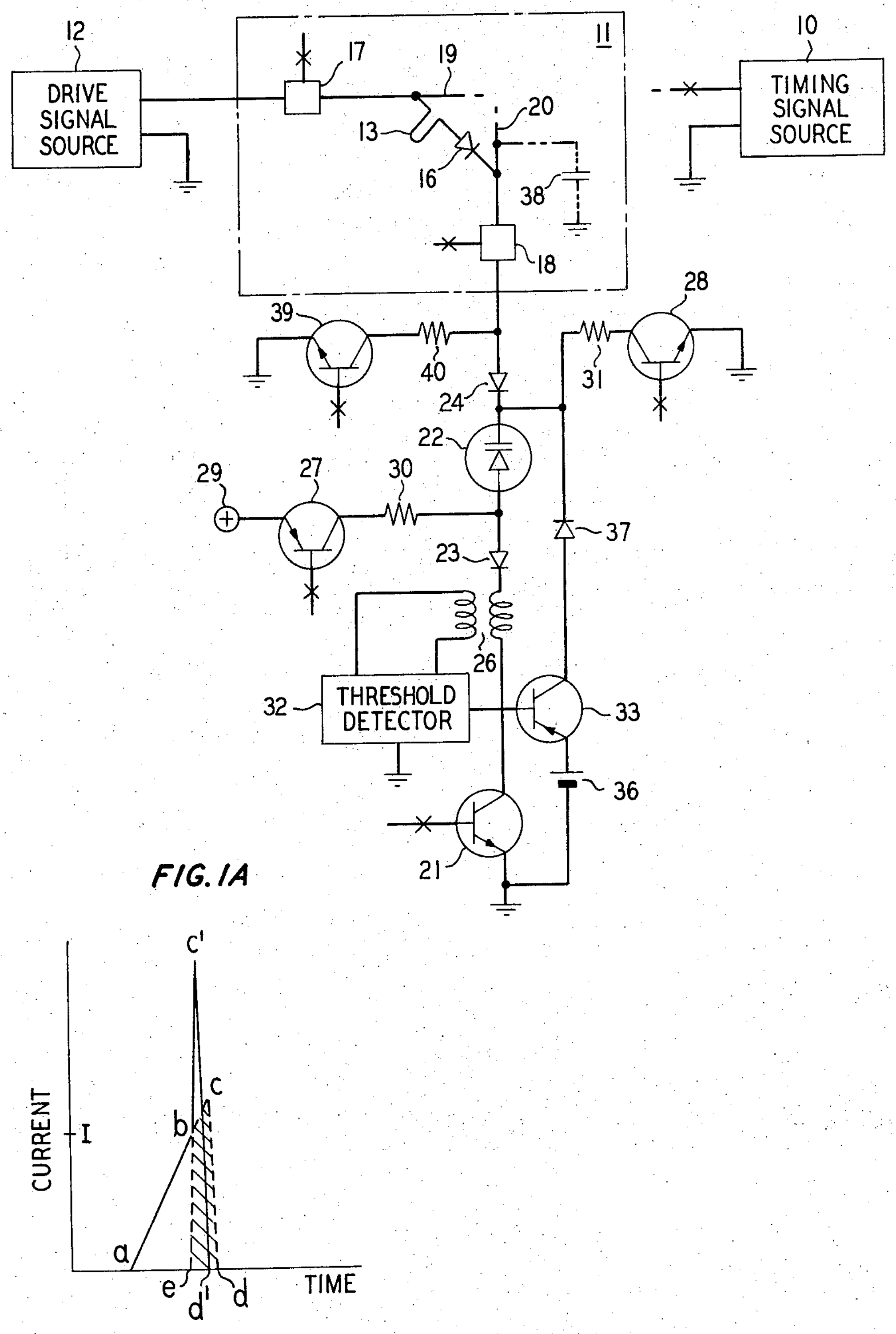
FIG. 1 is a schematic diagram of a magnetic memory drive circuit demonstrating the diode spike discharge technique utilized in the invention.
FIG. 1A is a current wave diagram illustrating the operation of one aspect of the invention.

In FIG. 1 a timing signal source 10 supplies pulse type signals in a predetermined sequence through an output circuit lead, indicated by an X, to similarly designated circuit leads for the magnetic store system shown in simplified form. A diode access matrix 11 is operated in a manner well known in the art in response to address signals from a source, not shown, for coupling the output of a drive signal source 12 to a word drive circuit 13 of an associated magnetic memory. The circuit 13 and an associated diode 16 connected in series therewith comprise one of a plurality of crosspoint load circuits for the matrix 11. Such a load is generally inductive in a memory system. Only one crosspoint load circuit and associated matrix rails are shown because matrix details are known in the art and are unnecessary to an understanding of the present invention.

Timing signals from source 10 actuate selection switches 17 and 18 in a word rail 19 and a diode rail 20, respectively, of the matrix. The actuated selection switches establish a current path through the matrix. At the same time, the source 10 supplies a further drive pulse to a common current control transistor 21. That transistor is driven into saturated conduction to complete the circuit path from the drive signal source 12 through the matrix 11, a diode 24, a charge storage diode 22, a further diode 23, a primary winding of a current transformer 26, and the transistor 21 to ground. The transistor 21 and diodes 23 and 24 are poled in the same direction as the crosspoint diode 16 for the forward conduction of current from the drive signal source 12. Charge storage diode 22 is, however, poled for forward conduction of current in the opposite direction in the aforementioned drive signal circuit. Consequently, diode 22 is unable to conduct unless it has first conducted sufficient forward current to accumulate an excess of current carriers therein as is known in the art.

Prior to the aforementioned operation of the selector switches 17 and 18 and transistor 21, timing signal source 10 actuates two transistors 27 and 28 by the application of negative and positive timing pulses to their respective base electrodes for driving them into saturated conduction. In that condition the transistors 27 and 28 conduct current from a positive source 29 through a current limiting resistor 30, the diode 22, and a further current limiting resistor 31.

The source 29 is schematically represented by a circled plus sign which indicated the positive terminal of a suitable source of potential, not otherwise shown, which has its other terminal connected to ground. Similar schematic representations for sources are used throughout the drawings with the circled polarity sign indicating the source terminal to which the circuit is connected.

When the desired charge level has been stored in the diode 22, by storing excess current carriers therein, the transistors 27 and 28 are disabled and the stored charge is isolated in the diode until such time as a discharge current path is provided. The exact amount of charge to be stored is, in accordance with one aspect of the present invention, not critical as long as it is at least equal to the maximum amount required to supply the necessary drive pulse amplitude to circuit 13 under worst case conditions.

As previously noted, the timing signal source subsequently enables a first discharge path for the diode 22 by establishing the aforementioned drive signal circuit from the source 12 through the matrix 11. The resulting drive pulse through diode 22 initiates discharge of that diode by purging the diode of carriers at a first predetermined rate. That rate is adapted to produce a drive current pulse to the memory word circuit 13 of more than the required amplitude and duration. Such drive pulse is configured in accordance with the circuit impedances and typically has a general triangular configuration with a comparatively broad base. An example of such a pulse is the triangular pulse *a-c-d* in FIG. 1A. The base duration is a function of the pulse rise and fall times which are determined by the circuit impedances and the characteristics of source 12.

In accordance with one aspect of the invention claimed in the aforementioned parent application, Ser. No. 781,167, current transformer 26 couples the increasing drive signal pulse amplitude to a threshold detector 32 which, upon attainment of its threshold, provides a negative-going output signal to a PNP transistor switch 33. The threshold is established at the predetermined maximum drive pulse amplitude to be applied to circuit 13. Current transformer 26 typically has a substantially short-circulated turn for a secondary winding so that it presents no significant inductance to the main drive circuit through drive signal source 12 and control transistor 21. Details of threshold detector 32 are not shown because they do not comprise a part of the invention and arrangements therefor are known in the art. In one embodiment, for example, the secondary winding of current transformer 26 drives a buffer amplifier in the form of a common base transistor circuit which operates from the low impedance output of the current transformer and provides a high impedance output to a Schmitt trigger circuit. The output of the latter circuit is the detector output which is applied between ground and the base electrode of transistor 33.

Transistor 33 is driven into saturated conduction to provide a current path from a battery 36 through an isolating diode 37 to the charge storage diode 22. The current thus provided to the charge storage diode is in aiding relationship with respect to the current from the drive signal source 12 and increases the discharge rate of the diode so that the remaining current carriers stored therein are purged from the diode almost instantaneously to produce an output current spike.

That spike of current for diode 22 is represented by the solid-line part *b-c'-d'* in FIG. 1A for the case wherein current amplitude for circuit 13 is to be limited at current level I corresponding to point *b* in the figure. Since the same amount of charge must be removed from diode 22 either with or without the present invention, the cross-hatched quadrangular area *b-c-d-e* must equal the narrow nearly-triangular area *b-c'-d'-e*.

Several factors must be taken into account in providing for a spike discharge of diode 22. It is necessary that the discharge occur so fast that there will be no injury to circuit elements either as a result of overheating or excessive forward or reverse voltages. Also, if the load, i.e., circuit 13, is to have an amplitude limit imposed upon it, that limit should not be exceeded. These factors are taken into account by the design of the described supplemental discharge current loop including transistor 33. For practical purposes the only impedances loading the battery 36, and thus limiting the spike amplitude, are the bulk resistances of the semiconductor devices including transistor 33; diodes 37, 22, and 23; and transistor 21. Leakage capacitance effects are nominal because such capacitances have already been charged to some extent during the initial part of the drive pulse; and they do not, therefore, constitute significant loading on battery 36 during spike discharge. It has already been noted that current transformer 26 adds no significant inductance, and the described supplemental current loop is designed to enclose the smallest possible area to keep its inductance to a minimum.

Diode 24 is a type now well known in the art which has low charge storage capabilities and does not support significant reverse current during the supplemental current spike. Thus, the supplemental current amplitude is limited only by the bulk resistances of the loop semiconductor devices and the amount of remanent charge in diode 22. Discharge is then realized almost instantaneously in a circuit of very low time constant.

Upon the exhaustion of the charge in diode 22 there is no longer a current path to accommodate the supplemental current, or to accommodate the drive signal current from the source 12, because both such currents are then confronted with the extremely high reverse impedance of the diode 22. The switching transistor 33 in the supplemental current loop does not slow down overall drive system operation because transistor turn-on times are generally quite fast and the turn-off operation is charge-limited by diode 22. The minimum value for the supplemental current pulse supplied through transistor 33 is dictated by the maximum amount of charge which is expected to remain in diode 22 under worst case conditions and the impedance of the drive signal circuit as seen from the cathode side of diode 37. Considering those impedances, the supplemental current pulse must be of sufficient amplitude to purge the diode 22 of the mentioned remanent charge practically instantaneously. A comparatively small battery 36 performs adequately since the operation of diode 22 makes it unnecessary for battery 36 to impose a reverse bias on diode 24.

It would, of course, be possible in accordance with prior art circuit techniques to apply the output of the threshold detector 32 to the base electrode of control transistor 21 for turning off that transistor upon the attainment of the desired current amplitude. However, it is well known that such transistors operate in a comparatively slow fashion during the turn-off aspect of their functioning. By comparison, the purging of remanent charge from diode 22 provides a fast and sharp turn-off of the drive signal from source 12.

The diode 23, which is connected in series in the drive signal circuit path as previously outlined, is not essential to the basic operation of the invention. It is provided because charge storage diodes such as the diode 22 are known to turn on quite sharply when they begin conduction in the reverse direction to remove stored charge. This sharp turn-on produces objectionable noise in some applications of the circuit. The use of the diode 23 in series superimposes the softer turn-on characteristics in the forward direction upon the sharp reverse turn-on characteristics of the diode 22 to produce a net, slightly rounded characteristic which avoids the aforementioned objectionable noise.

A transistor 39 is also provided for holding drive current amplitude at a predetermined level. The collector-emitter current path of the transistor is connected through a collector load resistor 40 between ground and the drive signal circuit at the diode rail 20. Transistor 39 is turned on by a positive output pulse from the timing signal source 10, subsequent to the turn-on of the transistor 21 but prior to the turn-on of the transistor 33 for extinguishing diode 22. The transistor 39 provides a holding current path that is utilized only in those applications of the system wherein it is desired to bring the drive current up to a predetermined level and hold it there for a fixed time which is longer than the current of that level could be sustained by diode 22. In those cases the previously described supplemental current circuit for the diode 22 serves only to prevent an excess current level from being attained while the system is coming up to the level which is to be held by transistor 39. Diode 24 isolates the circuit of transistor 39 from the supplemental current circuit to prevent supplemental current shunting through the transistor.

Figure 2:
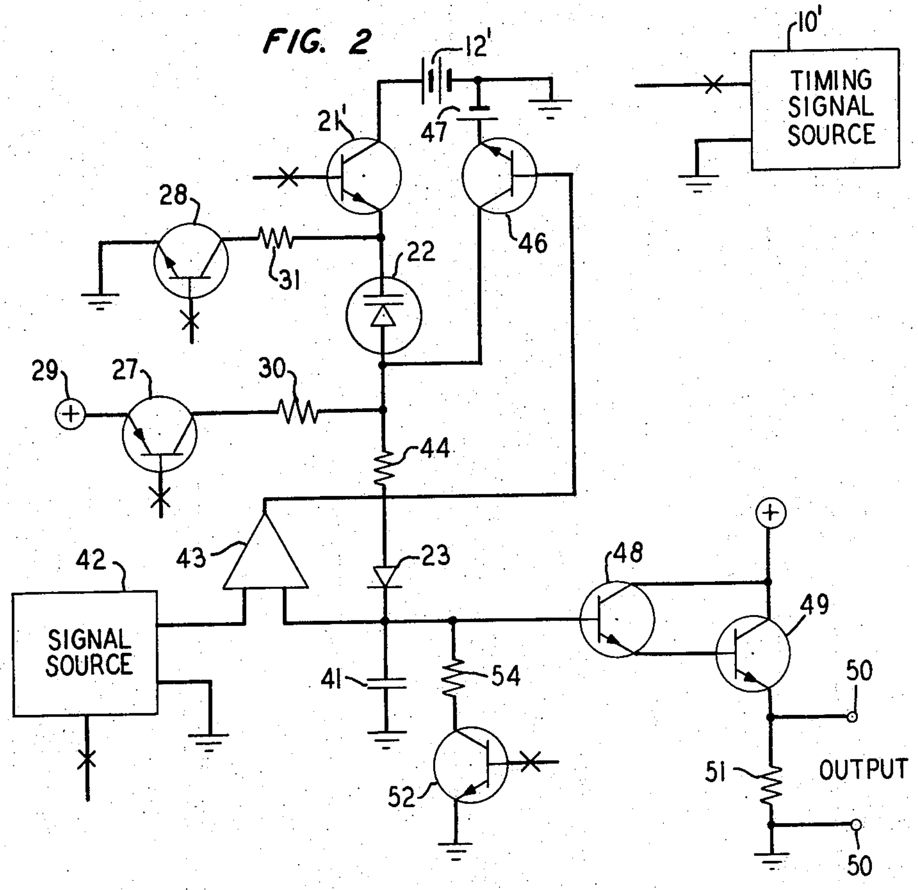
FIG. 2 is a schematic diagram of a single-channel sample and hold circuit demonstrating the diode spike discharge technique utilized in the invention.

In FIG. 2 the fast discharge aspect of the invention is applied to a sample and hold circuit embodiment, the features of which embodiment are claimed in my copending divisional application, Ser. No. 83,633 filed Oct. 23, 1970. Some circuit elements in FIG. 2 are similar to those utilized in FIG. 1 and are, therefore, indicated by the same or similar reference characters. Thus, output pulses from the timing signal source 10′ initially actuate transistors 27 and 28 to store an excess of current carriers in the charge storage diode 22. Thereafter, the control transistor 21′ is actuated to establish a path for current from the battery 12′ through that transistor and through diode 22, diode 23, a small current limiting resistor 44, and a holding capacitor 41. The initial current is at a comparatively high level and falls off as capacitor 41 is charged.

At the same time that the charge on diode 22 is being thus transferred to the holding capacitor 41, the output of timing signal source 10′ is also holding an information signal source 42 actuated to provide an output signal sample to one input of a comparator circuit 43 of a type well known in the art. Another input connection on the same comparator receives the potential difference across capacitor 41. When that potential difference and the signal sample from source 42 are substantially equal in magnitude, the comparator 43 produces a positive-going output pulse to the base electrode of a transistor 46. The charge on capacitor 41 is thus both a measure of the time that charging current was applied from diode 22 and a measure of the signal sample magnitude from source 42. The transistor 46 is biased into conduction at a saturated level and shunts the discharge current of diode 22 away from the diode 23 and holding capacitor 41 through the transistor 46 to a small battery 47. Resistor 44 is assigned a value which is as small as possible but limits current enough to prevent excessive overshoot of the charge on capacitor 41 while comparator 43 is responding to signal equality to actuate transistor 46.

A low impedance current path is available for discharging diode 22 at an extremely rapid rate through the transistors 21′ and 46. The current through diode 22 after transistor 46 beings to conduct is much larger than the current before transistor 46 began to conduct because the charged capacitor 41 is no longer reducing current flow in the new discharge loop. This difference in current level is sufficient to complete the purging of charge from diode 22 in the form of a current spike.

The terminal voltage of the battery 47 is less than that of the battery 12' but oppositely poled. Battery 47 provides a threshold against operation of transistor 46 by noise in the output of comparator 43, and such threshold can often be built into comparator 43 to reduce the elements in the circuit of transistor 46. The loop circuit through batteries 47 and 12', transistor 21', diode 22, and transistor 46 corresponds to the supplemental current circuit of FIG. 1 in that its impedance is principally the bulk resistance of the mentioned semiconductor devices. However, instead of adding current from a new source, as was done in FIG. 1, the reactance of capacitor 41 is by-passed as far as diode 22 is concerned, and the resulting increase in diode discharge current completes diode discharge in the desired spike fashion. The fast charging of capacitor 41 for the sampling phase of operation reduces the duration of the necessary charging interval since a low impedance source is used, and more precise sampling results are obtained. The spike discharge operation for diode 22 makes it possible to interrupt the capacitor charging path rapidly.

During the aforementioned sampling operation the holding capacitor 41 was charged to the level of the information signal sample but did not impose a load on the signal source 42 because of the intervening comparator 43. The held sample magnitude information stored on capacitor 41 is continuously coupled through a high input impedance, such as a Darlington pair of transistors 48 and 49, to output terminals 50. The output voltage is developed across an emitter resistor 51 for transistor 49. The Darlington pair transistors present a high impedance to the capacitor 41 so that they cannot significantly dissipate a charge on that capacitor during operation of the sample and hold circuit.

Before each new sample is to be stored in capacitor 41, and since its value is continuously coupled to the Darlington pair and output terminals 50, timing signal source 10' applies a positive pulse to the base electrode of a transistor 52 for discharging capacitor 41 by a predetermined amount through a resistor 54. The amount is selected as a function of analog signal characteristics and is adapted to reduce the largest expected sample to a level below the smallest expected sample to retain sensitivity to all input samples. However, preferably the smallest expected sample is never reduced to zero. In this way the least possible amount of time is required to establish each new sample level charge in capacitor 41 so that the sample and hold circuit operates at a high sample rate.

Figure 3:
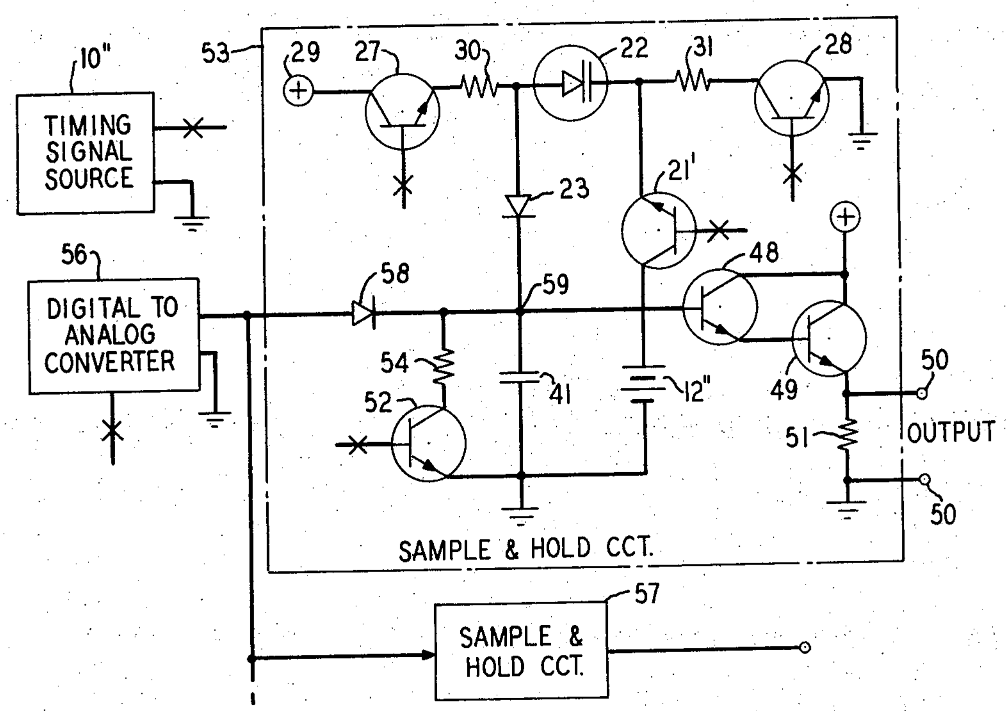
FIG. 3 is a schematic diagram of a time division multiplex sample and hold circuit in accordance with the invention.

FIG. 3 represents a time-sharing sample and hold system in which a first sample and hold circuit 53, which is of a type similar to that just described in connection with FIG. 2, shares the output of a digital to analog converter 56 with a plurality of other sample and hold circuits such as the circuit 57. All of the sample and hold circuits are of the same type so only the circuit 53 is shown in detail. The sharing of the output of the converter 56 is accomplished on a time division multiplex basis under the control of sequential output pulse trains from timing signal source 10''. Again, in FIG. 3, circuit elements which are similar to those employed in other figures are indicated by the same or similar reference characters.

The input of each sample and hold circuit is coupled to receive signals from the converter 56 through its own individual isolating diode 58. Each diode 58 is poled to conduct positive-going signals from the converter 56 to a circuit terminal 59 at the ungrounded side of capacitor 41 in the charging circuit for that capacitor from the charge storage diode 22. Assuming that the previously determined quantity of charge has been removed initially from capacitor 41 by action of transistor 52, the charge-storage diode 22 is charged from the source 29 with a predetermined unit of charge as in the previous embodiments. In the embodiment of FIG. 3, however, the unit charge magnitude is somewhat larger than the difference between the maximum and minimum anticipated signals from converter 56.

Subsequently, timing signal source 10'' actuates converter 56 to couple a signal sample through diode 58 to capacitor 41 to increase the charge on that capacitor by an amount corresponding to the magnitude of the signal. Source 10'' then actuates transistor 21' to supply a drive current from battery 12'' for discharging the charge-storage diode 22 through diode 23 and the capacitor 41. The latter discharge path includes no lumped inductance and is made as small as possible to hold loop inductance to a minimum.

Battery 12'' has a larger terminal voltage than did corresponding batteries in other embodiments because capacitor 41 is now included in the discharge loop. Battery 12'' is large enough to sustain the spike discharge mode in spite of the charged capacitor 41 in the loop. Otherwise, the discharge path has an extremely low impedance and corresponding low-time constant as in other embodiments. The discharge current magnitude is thus limited primarily by the bulk resistance of semiconductor devices in the path while diode 22 conducts, and the full charge from diode 22 is rapidly transferred in spike fashion onto capacitor 41. The transfer of the full unit charge from diode 22 to capacitor 41 takes place in an interval that is much shorter than the one required to charge the capacitor from converter 56. Such transfer from diode 22 to capacitor 41 increases the potential difference across that capacitor and reversely biases the isolating diode 58. Consequently, the charge on capacitor 41 cannot be disturbed by any possible crosstalk from output signals of converter 56 which are subsequently applied to other sample and hold circuits in the system. The other sample and hold circuits operate in the same fashion as the circuit 53 in the sequence in which their respective transistors 52 are actuated to release charge from capacitor 41 and thereby enable diode 58 in the respective sample and hold circuits.

Just prior to the time interval for a repeated operation of sample and hold circuit 53, the timing signal source 10'' applies a positive pulse to the base electrode of transistor 52 for removing from capacitor 41 an increment of charge which will bring the potential difference thereacross down to a level that is lower than the smallest anticipated signal from converter 56 as previously described in connection with FIG. 2. The sample and hold circuit 53 is then operated in the same manner previously described to charge capacitor 41 from converter 56, supplement that charge with the unit charge from diode 22, and hold the total charge on capacitor 41 as needed by the output connected to terminals 50 until such time as transistor 52 is again prefired in anticipation of a new sample from converter 56.

Since the incremental unit charge added to capacitor 41 from diode 22 is of a known magnitude, it constitutes a predetermined pedestal for the information transferred to that capacitor from the converter 56. Consequently, the transferred information is readily detectable in the form in which it appears at the output terminals 50. Here the operation of a charge storage diode in the spike discharge mode permits multiple sample and hold circuits to time share a signal source with only a simple isolating diode, rather than a more complex time-controlled switching arrangement, in the signal path.

Although the present invention has been described in connection with particular embodiments thereof, it is to be understood that additional embodiments and modifications which will be obvious to those skilled in the art are included within the spirit and scope of the invention.

What is claimed is:

1. In combination,
at least one charge storage diode having a predetermined excess of current carriers stored as an electrical charge therein,
a different capacitor connected in series with each said diode,
an electric circuit for charging each said capacitor, and
means connected for discharging each said diode by producing a spike of current therethrough and through said capacitor in series therewith in a reverse conduction direction for the diode to transfer the entire charge from said diode to said capacitor in said spike of current to raise the charge on said capacitor as derived from said electric circuit by an additional pedestal charge corresponding to said predetermined excess of current carriers.

2. In combination,
at least one charge storage diode having a predetermined excess of current carriers stored as an electrical charge therein,
a different capacitor connected in series with each said diode,
an electric circuit for charging each said capacitor,
said electric circuit comprises a source of analog signals having predetermined maximum and minimum magnitudes, and a different coupling diode for coupling said analog signals to charge each said capacitor,
means connected for discharging each said diode by producing a spike of current therethrough in a reverse conduction direction for the diode to transfer the entire charge from said diode to said capacitor in said spike of current, and
said charge transferred from each said charge storage diode has a magnitude corresponding to the difference between said maximum and minimum magnitudes for reversely biasing the corresponding coupling diode.

3. The combination in accordance with claim 2 in which
the maximum duration of said current spike is much shorter than the time required to charge said capacitor from said source of analog signals.

4. In combination,
at least one charge storage diode having a predetermined excess of current carriers stored as an electrical charge therein,
a different capacitor connected in series with each said diode,
an electric circuit for charging each said capacitor, said circuit including means for coupling to such capacitor input signals of plural signal levels in a range between predetermined maximum and minimum signal magnitude levels,
means, exclusive of said electric circuit, connected for discharging each said diode by producing a spike of current therethrough in a reverse conduction direction for the diode to transfer the entire charge from said diode to said capacitor in said spike of current, and
a diode charging circuit is connected for supplying forward current to said diode for producing therein said carriers in sufficient amount to cause said spike to transfer from each diode to its associated capacitor sufficient charge to bring total capacitor voltage to a level at least equal to said maximum level.

5. A time division sample and hold circuit comprising
an input circuit for providing signals to be sampled, said signals having plural levels in a range between predetermined maximum and minimum signal magnitude levels,
a plurality of diodes connected to receive said signal in multiple from said input circuit and similarly poled with respect thereto,
a plurality of capacitors, each connected for receiving signals from said input circuit by way of a different one of said diodes,
a plurality of charge storage diodes,
means for charging each of said charge storage diodes to a predetermined common voltage level,
means for recurrently discharging each of said capacitors in sequence to a level at least as low as said minimum magnitude level to initiate charging of such capacitor by said signals to represent a sample of said signals, and
means connected for recurrently transferring the charge from each of said charge storage diodes in sequence into a different one of said capacitors, respectively, to bring the total charge on each such capacitor to a level at least equal to said maximum level to terminate the charging of such capacitor by said signals.

* * * * *